United States Patent Office 3,134,817
Patented May 26, 1964

---

3,134,817
PROCESS FOR THE PREPARATION OF A SUBSTITUTED TETRALONE
Robert Joly, Montmorency, Seine-et-Oise, Julien Warnant, Neuilly-sur-Seine, and Jean Jolly, Fontenay-sous-Bois, Seine, France, assignors, by mesne assignments, to Roussel-UCLAF, S.A., Paris, France, a corporation of France
No Drawing. Filed Feb. 10, 1961, Ser. No. 88,253
Claims priority, application France Feb. 18, 1960
2 Claims. (Cl. 260—590)

The present invention relates to a new process for the preparation of 2-hydroxy methylene-6-methoxy-tetralone-1 of the structural formula

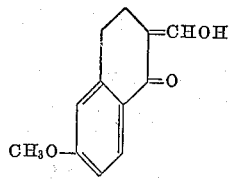

2-hydroxy methylene-6-methoxy-tetralone-1 is useful as an intermediate for the total syntheses of steroids, Banerjee et al., J. Am. Chem. Soc 78, 3769 (1956), and was prepared by these authors by condensation of 6-methoxy-tetralone-1 with ethyl formate in the presence of either an alkali metal or an alcoholate or hydride of an alkali metal. This condeansation presented a number of inconveniences which made the realization of this synthesis on an industrial scale difficult, if not impossible. The handling of large quantities of alkai metals gives rise to grave dangers. On the other hand, the preparation of an appropriate alcoholate such as sodium ethylate free from solvent is very laborious and requires elevated temperatures if one wishes to prepare this product in a pure state, which state is indispensable for the obtention of good yields. As for the use of alkali metal hydrides, these are costly reactants and the condensation utilizing them is not economical.

It is an object of the present invention to obtain 2-hydroxy methylene-6-methoxy-tetralone-1 of the structural formula

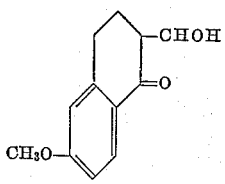

I in good yields while avoiding the use of alkali metals, alkali metal alcoholates or alkali metal hydrides.

It is another object of this invention to obtain an improvement in the condensation of 6-methoxy-tetralone-1 with a lower alkyl formate to form 2-hydroxy methylene-6-methoxy-tetralone-1 by conducting the condensation in the presence of a solution of an organozinc salt having the formula $$R_1ZnX$$

in an N-N-dialkylamide having the formula

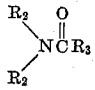

wherein $R_1$ and $R_2$ are lower alkyl, $R_3$ is a member selected from the group consisting of hydrogen, methyl and ethyl and X is a member selected from the group consisting of halide, methosulfate and ethyl sulfate radicals.

These and other objects of the invention will become more apparent as the description thereof proceeds.

The process which is the object of this invention consists in effecting the condensation of 6-methoxy-tetralone-1 with a lower alkyl formate in the presence of a solution of an organozinc salt having the formula $R_1ZnX$, in an N,N-dialkylamide having the formula

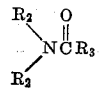

wherein $R_1$ and $R_2$ are lower alkyl, $R_3$ is a member selected from the group consisting of hydrogen, methyl and ethyl, and X is a member selected from the group consisting of halide, methosulfate and ethyl sulfate radicals.

By "tetralone-1" we mean a 1,2,3,4-tetrahydronaphthalene substituted in the 1-position by an oxo group.

The present invention allows the avoidance of the inconveniences described above in the prior art processes. It gives an industrial process for the preparation of 2-hydroxy methylene-6-methoxy tetralone-1 which presents no dangers and is easily adopted. The new process necessitates neither a previous laborious preparation of reactants nor elevated temperatures. An important advantage of this new process is the obtention of very high yields, practically quantitative yields. The other advantages of the invention will become apparent to those skilled in the art from the description which follows.

The reaction occurs according to the following reaction scheme:

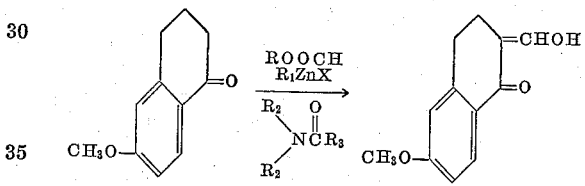

The solution of the organozinc salt $R_1ZnX$ in N,N-dialkylamide is prepared according to United States Patent application Ser. No. 11,167, filed February 26, 1960, now Patent No. 3,040,079. Robert Joly, one of the co-inventors of the present invention, is a co-inventor with Robert Bucourt of Ser. No. 11,167. This application describes a process for producing a stable solution of an organozinc salt having the formula $R_1ZnX$, in an N,N-dialkylamide having the formula wherein $R_1$ and $R_2$ are lower alkyl, $R_3$ is a member selected from the group consisting of hydrogen, methyl and ethyl, and X is a member selected from the group consisting of halide, methosulfate and ethyl sulfate radicals which comprises the step of reacting metallic zinc with an organic compound having the formula $R_1X$ wherein $R_1$ and X have the above-assigned meanings at a temperature between about 20° and 100° C. in the presence of an excess of an N,N-dialkylamide having the formula

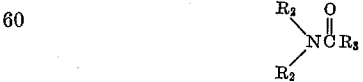

wherein $R_2$ and $R_3$ have the above-assigned meanings.

In the method of execution actually preferred but not limited thereto, the process of the present invention can be characterized by the following points:

(a) There is used as the organozinc salt, $R_1ZnX$, a bromide or iodide of methyl zinc;

(b) The N,N-dialkylamide utilized is dimethylformamide;

(c) The reaction is conducted between the temperatures of about 50 to 70° C.

The following non-limiting example is given as purely indicative and enables a better comprehension of the invention to those skilled in the art.

EXAMPLE

A. *Preparation of Methyl Zinc Bromide*

A current of methyl bromide was bubbled through a mixture of 300 cc. of dimethylformamide and 400 g. of powdered zinc. Then the temperature was raised, while continuing the flow of methyl bromide through the solution, 10 g. of iodine were added, the reaction started, and the reaction mixture was maintained at 50° C. under agitation and in an atmosphere of nitrogen for two hours while bubbling methyl bromide through the solution and adding during this time 700 cc. of dimethylformamide. The solution of the zinc derivative obtained was then decanted from any unreacted zinc powder.

B. *Condensation*

The solution of methyl zinc bromide obtained according to A was heated to 55° C. and 900 cc. of ethyl formate was added slowly. A liberation of methane was produced. 400 g. of 6-methoxy tetralone-1 in 500 cc. of dimethylformamide were then added very slowly. The reaction mixture was agitated at 60° C. for 2½ hours. A reddish orange solution was obtained. After destruction of the excess methyl zinc bromide by the addition of acetic acid, the solution was cooled, filtered, then poured into a mixture of water and ice. Crystallization was initiated by scratching. The mixture was agitated for an hour, vacuum filtered, dried and 463 g. (about 100%) of 2-hydroxy-methyl-ene-6-methoxy-tetralone-1 were recovered (being a quantitative yield). The product melted at 66–67° C. By recrystallization from isopropylic ether, the pure product was obtained, melting at 68–69° C. with a yield of 85%.

*Analysis.*—$C_{12}H_{12}O_3$ calculated: C, 70.57%; H, 5.92%; O, 23.5%. Found: C, 70.8%; H, 5.9%; O, 23.7%.

Other organozinc salts in solution in N,N-dialkylamides can be employed in place of methyl zinc bromide such as methyl zinc iodide, methyl zinc chloride, ethyl zinc bromide, etc., in dimethylformamide, diethylformamide, etc.

The preceding example is illustrative of the invention. It is to be understood, however, that this specific embodiment is non-limiting and other alternative procedures, as would occur to one skilled in the art, can be employed without departing from the spirit of the invention or the scope of the appended claims.

We claim:

1. A process for the production of 2-hydroxy methylene-6-methoxy-tetralone-1 having the structural formula

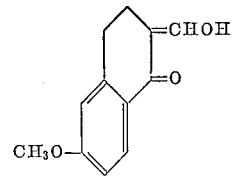

which comprises the step of condensing 6-methoxy-tetralone-1 with a lower alkyl formate in the presence of of a solution of an organozinc salt having the formula $R_1ZnX$ in an N,N-dialkylamide having the formula

wherein $R_1$ and $R_2$ are lower alkyl, $R_3$ is a member selected from the group consisting of hydrogen, methyl and ethyl, and X is a member selected from the group consisting of halide, methosulfate and ethyl sulfate radicals at a temperature of between about 50° C. and about 70° C. and recovering said 2-hydroxy-methylene-6-methoxy-tetralone-1.

2. The process of claim 1 wherein the organozinc salt in N,N-dialkylamide is methyl zinc bromide in dimethylformamide.

References Cited in the file of this patent

UNITED STATES PATENTS 2,942,017     Petree _____ June 21, 1960

FOREIGN PATENTS 1,091,115     Germany _____ Oct. 20, 1960

OTHER REFERENCES

Johnson et al: Journal of the American Chemical Society, vol. 67, page 1745 (1945).

Banerjee et al.: Journal of the American Chemical Society, vol. 78, page 3769 (1956).

Rochow: Chemistry of Organometallic Compounds, pages 100–105 (1957).